(12) United States Patent
Gilbert

(10) Patent No.: US 7,062,564 B2
(45) Date of Patent: Jun. 13, 2006

(54) SYSTEMS AND METHODS FOR AN E-MAIL CLEARING HOUSE

(75) Inventor: Quenton Lanier Gilbert, Atlanta, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 649 days.

(21) Appl. No.: 10/243,900

(22) Filed: Sep. 13, 2002

(65) Prior Publication Data

US 2004/0054734 A1    Mar. 18, 2004

(51) Int. Cl.
*G06F 15/16*     (2006.01)

(52) U.S. Cl. .................. 709/227; 709/206; 709/216

(58) Field of Classification Search ........ 709/200–203, 709/206–207, 217–219, 227–228, 213–216
See application file for complete search history.

(56) References Cited

U.S. PATENT DOCUMENTS

| | | | |
|---|---|---|---|
| 5,937,161 A * | 8/1999 | Mulligan et al. ........... | 709/206 |
| 6,353,852 B1 * | 3/2002 | Nestoriak et al. ........... | 709/206 |
| 6,405,243 B1 * | 6/2002 | Nielsen ...................... | 709/206 |
| 6,427,164 B1 * | 7/2002 | Reilly ........................ | 709/206 |
| 6,438,583 B1 * | 8/2002 | McDowell et al. ......... | 709/206 |
| 6,654,779 B1 * | 11/2003 | Tsuei ........................... | 718/101 |
| 6,782,003 B1 * | 8/2004 | Giroux et al. .............. | 370/466 |
| 6,832,246 B1 * | 12/2004 | Quine ......................... | 709/207 |
| 6,839,738 B1 * | 1/2005 | Quine et al. ................ | 709/206 |
| 6,892,222 B1 * | 5/2005 | McDowell et al. ......... | 709/206 |
| 6,895,427 B1 * | 5/2005 | Quine et al. ................ | 709/206 |
| 6,920,483 B1 * | 7/2005 | Cordray et al. ............. | 709/206 |

\* cited by examiner

*Primary Examiner*—Moustafa M. Meky
(74) *Attorney, Agent, or Firm*—Parks Knowlton LLC; J. Perry Herndon, Esq; Coulter C. Henry

(57) ABSTRACT

Systems and methods provide e-mail forwarding by receiving a first message from a first e-mail system, the first message being previously addressed to a first e-mail account address on the first e-mail system; associating the first message previously addressed to the first e-mail account with a second e-mail account address; forwarding the first message to the second e-mail account address; and arranging for an incentive to be shared between the first e-mail system and a forwarding system that receives the first message.

57 Claims, 7 Drawing Sheets

SYSTEMS AND METHODS FOR AN E-MAIL CLEARING HOUSE

FIELD OF THE INVENTION

The present invention relates to the field of electronic mail messages. More particularly, the present invention, in various specific embodiments, involves methods and systems directed to the forwarding of electronic mail messages.

BACKGROUND OF THE INVENTION

In the electronic age in which we are living, electronic mail (e-mail) users are constantly being inundated with e-mail from various sources. For example, we receive e-mails from friends and family, business colleagues, and businesses trying to sell goods and services.

Since e-mail has become a frequently used method of communication, it is very inconvenient when an e-mail user changes e-mail accounts. The change in e-mail account is usually due to a change in e-mail system provider, which usually has no incentive for forwarding e-mails of previous system users. For example, the change in e-mail accounts may be caused by a change in employer or simply due to a users preference for a new e-mail system provider.

One method used to continue to receive e-mail from friends and family, business colleagues, and businesses trying to sell goods and services is for the e-mail user to notify e-mail senders of the change in e-mail provider and the address to the new e-mail account. While this can help to transition to the new e-mail system provider and to keep receiving e-mails, it can be undesirable and burdensome to be forced to contact each and every one who has the prior e-mail address. Additionally, contacting each of these e-mail senders does not guarantee that the e-mail sender will take notice of the new e-mail address. Thus, simply contacting the e-mail senders is not very helpful in many situations.

Another method used to continue to receive e-mail from friends and family, business colleagues, and businesses trying to sell goods and services is to sign up with an e-mail forwarding service, such as the one operated by Return Path. Return Path allows an e-mail user to register a new e-mail account. After entering a user name and password, the e-mail user enters an old e-mail account address from which the e-mail user wishes to forward e-mails and a new e-mail account address that will receive the forwarded e-mails.

During the registration process, the e-mail user has the option to specify how the e-mails from the old e-mail account will be delivered. As one option, the e-mail user may select that a message is first sent to the new e-mail account notifying the e-mail user that an e-mail addressed to the old e-mail account has been received. It gives the e-mail user the option to accept or reject the e-mail and provide the e-mail sender the new e-mail account address. Or as a second option, the e-mail user may select that e-mail addressed to the old e-mail account be directly delivered to the new e-mail account address and allow the e-mail user to use the e-mail in a standard manner.

One of the problems with using a method such as Return Path is that, in order for someone to send an e-mail to a new e-mail account, the e-mail sender must first know of the Return Path site. In other words, the e-mail sender must login to the Return Path site, find if the person they are seeking is registered, and only then can they send the e-mail with the old e-mail account address to the new e-mail account address. Therefore, unless the e-mail sender knows about the Return Path site, there is no way for e-mail to reach the e-mail user's new e-mail account, assuming the e-mail user has not posted the new e-mail account on the web and it happens to show up in a search engine.

Another problem with using a method such as Return Path is that for products such as electronic magazine subscriptions and other electronic products, if the e-mail user does not remember to change the e-mail account address where the electronic products are to be received, the sender of the electronic product will receive return messages indicating that the address cannot be found. Eventually, after trying to send the electronic product to the old e-mail address a number of times, the sender of the electronic product may give up and discontinue sending the electronic product. For these types of electronic products, which are usually sent through some sort of automated means, the Return Path method for forwarding e-mails may not be useful.

Thus, there remains a need for efficient and convenient systems and methods for forwarding e-mails to e-mail users, when a change in e-mail account occurs.

SUMMARY OF THE INVENTION

Methods, systems, and articles of manufacture consistent with embodiments of the present invention overcome the deficiencies of e-mail forwarding systems and methods by providing an e-mail forwarding system utilizing a method, which comprises receiving a first message from a first e-mail system, the first message being previously addressed to a first e-mail account address on the first e-mail system; associating the first message previously addressed to the first e-mail account with a new e-mail account address; and forwarding the first message to the new e-mail account address. The method utilized may also comprise using a revenue model to distribute a fee paid by the user between the first e-mail system and an e-mail clearing house.

More particularly stated, an e-mail forwarding system in accordance with an embodiment of the present invention provides an e-mail clearing house server comprising: a memory with a look-up table; a network connection to a first and a second e-mail system; and a processor. The processor is operative to: receive a first message from the network connection to the first e-mail system, the first message being previously addressed to a first e-mail account address on the first e-mail system; associate the first message previously addressed to the first e-mail account address with a new e-mail account address on the second e-mail system; forward the first message from the network connection to the new e-mail account on the second e-mail system; and arrange an incentive to be shared by the first e-mail system and a forwarding system that receives the first message.

In one embodiment of the present invention, the system and method may also provide a message to the new e-mail account address. Before forwarding the first message, the e-mail clearing house may provide a message to the new e-mail account address inquiring: i) whether the user wishes the e-mail clearing house to forward the first message to the new e-mail account address; and ii) whether the new e-mail account address should be disclosed to the sender of the first message. And, in response to the message inquiries, the e-mail clearing house may take the appropriate actions to comply with the user's wishes.

Additional advantages of the invention will be set forth in part in the description which follows, and in part will be obvious from the description, or may be learned by practicing the invention. The advantages of the invention will be realized and attained by means of the elements and combinations particularly pointed out in the appended claim.

It is to be understood that both the foregoing general description and the following detailed description are exemplary and exemplary only and are not restrictive of the invention, as claimed.

The accompanying drawings, which are incorporated in and constitute a part of the specification, illustrate embodiments of the invention and together with the description, serve to explain the principles of the invention.

DESCRIPTION OF THE EMBODIMENTS

Introduction

In accordance with an embodiment of the present invention, when an e-mail user changes e-mail account addresses, the e-mails received at the old e-mail account are advantageously forwarded to the new e-mail account address. To accomplish this, the e-mails are forwarded by the old e-mail account provider to an e-mail clearing house, which uses a look-up table to locate the new e-mail account address associated with the old e-mail account and accordingly forwards the received e-mails to the new e-mail account. This can be accomplished without the need for the e-mail sender to know that the intended recipient has a new e-mail account.

System Operation

Figure 1:
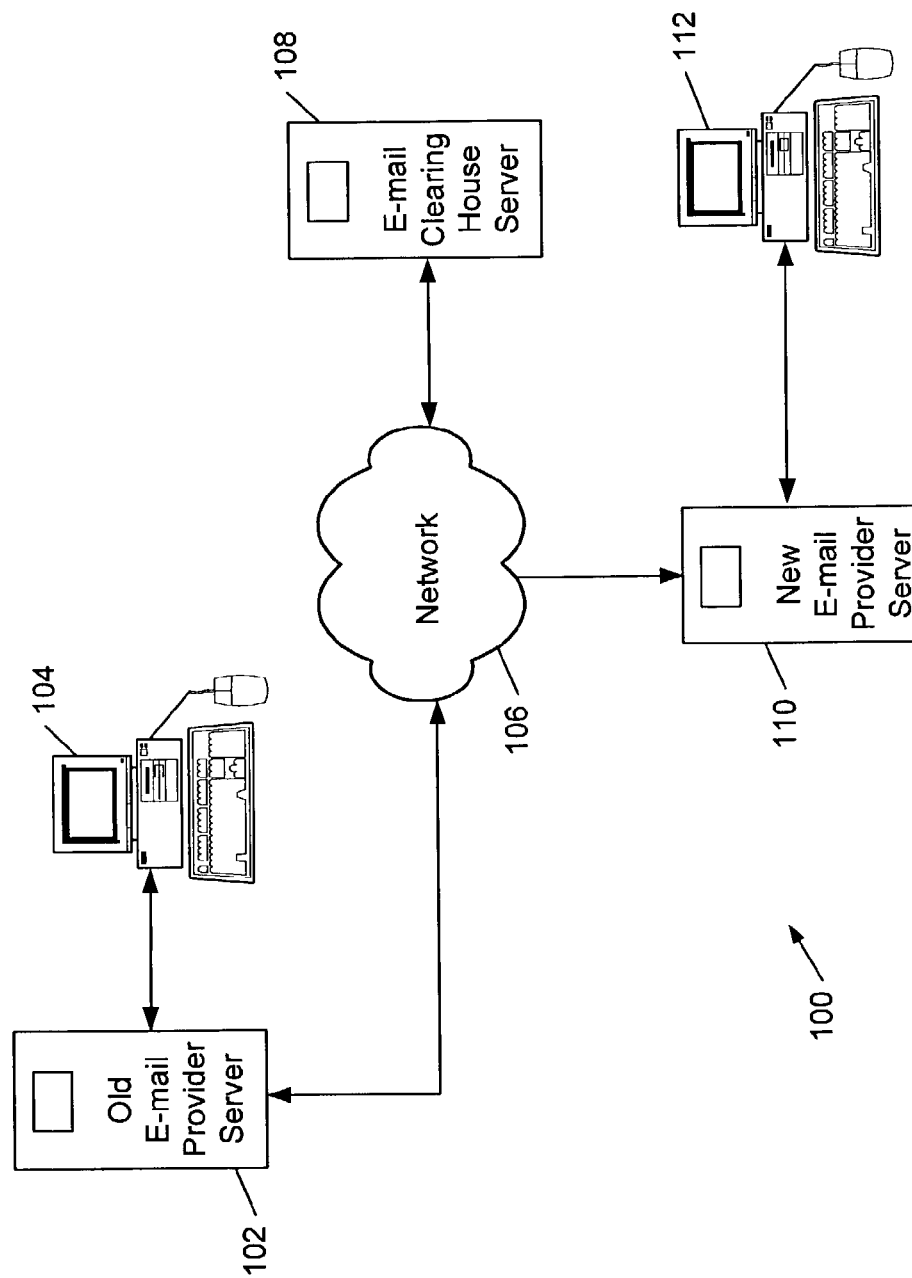
FIG. 1 is a diagram illustrating an exemplary e-mail forwarding system in accordance with an embodiment of the present invention.

In accordance with an exemplary embodiment of the present invention, FIG. 1 illustrates an exemplary e-mail forwarding system 100 comprising an old e-mail provider server 102 and an associated personal computer 104, a network 106, an e-mail clearing house server 108, and a new e-mail provider server 110 and associated personal computer 112. Personal computers 104 and 112 may be implemented as any type of e-mail client, such as a pager, cell phone, PDA, workstation or other e-mail platform that allows an e-mail user to interface with the associated server.

In one embodiment, network 106 may be the Internet, an Intranet, an Extranet, or any type of communication network. Old and new e-mail provider servers (102 and 110) may be personal computers or other types of computing hardware, instead of servers, containing the appropriate software for maintaining and operating an e-mail system.

In the exemplary embodiment illustrated in FIG. 1, old and new e-mail provider servers (102 and 110) are connected to their respective personal computer (104 or 112) through a communication link using an e-mail transfer protocol or some other type of electronic communication. Personal computers 104 and 112 allow an e-mail user to send and receive e-mails through the associated old or new e-mail provider server (102 or 110).

Furthermore, old e-mail provider server 102, e-mail clearing house server 108, and new-e-mail provider server 112 are inter-connected through network 106, and transfer e-mails between each other using an e-mail transfer protocol or some other type of electronic communication.

Figure 2:
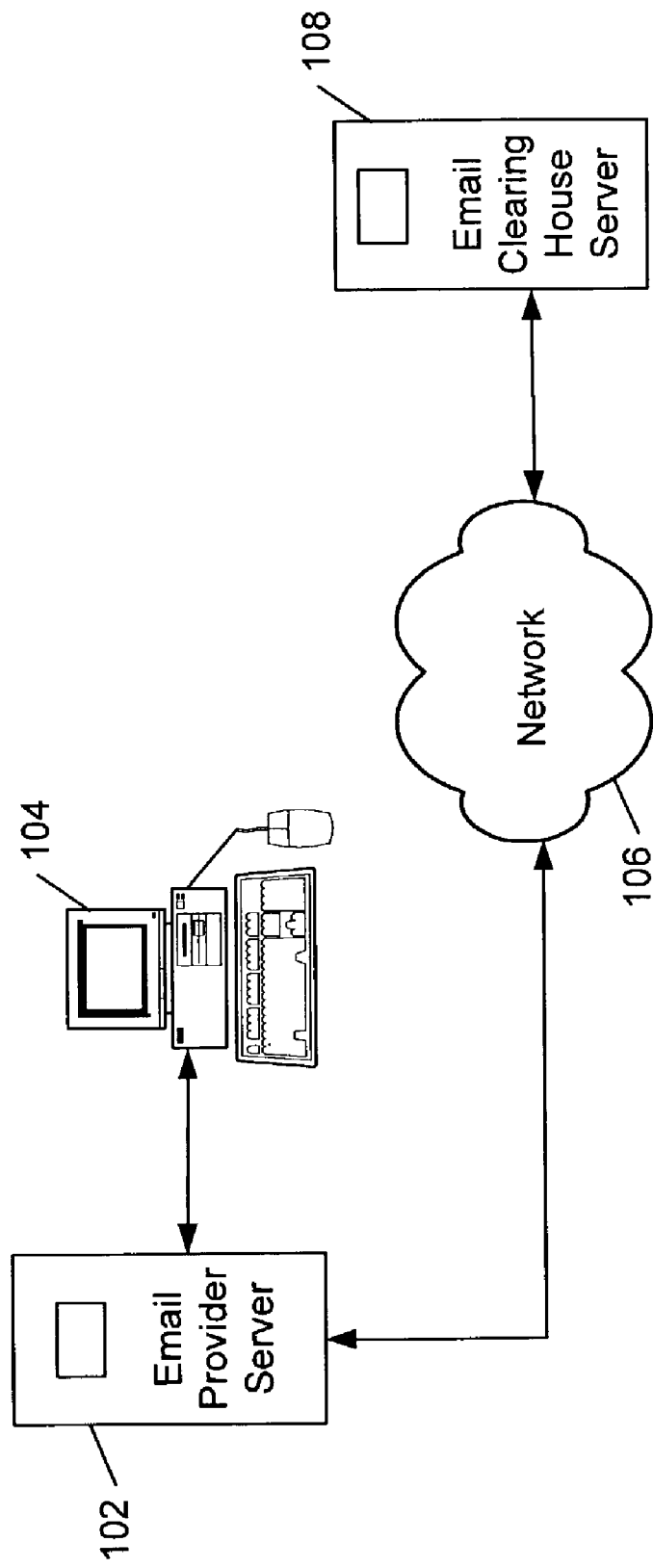
FIG. 2 is a diagram illustrating an exemplary registration process using the exemplary e-mail forwarding system illustrated in FIG. 1.
Figure 3:
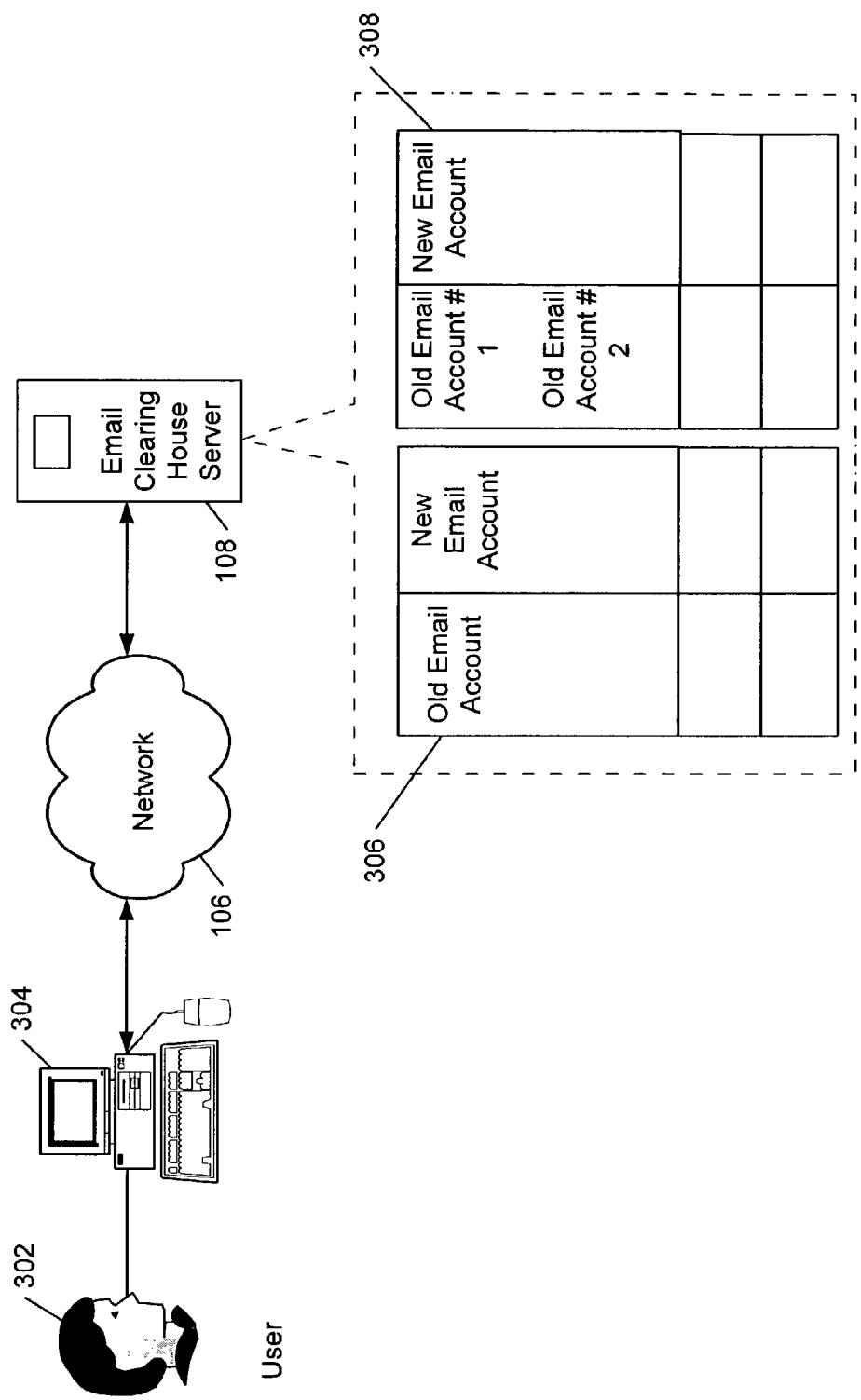
FIG. 3 is a diagram illustrating another exemplary registration process using the exemplary e-mail forwarding system of FIG. 1.

In order to use exemplary system 100, an e-mail user's old e-mail account address and new e-mail account address are registered with e-mail clearing house server 108. The registration process may be accomplished using the components of exemplary system 100 as illustrated in FIGS. 2 and 3. For example, in FIG. 2, at the e-mail user's request, old e-mail provider server 102 may contact e-mail clearing house server 108 via network 106 and request that the e-mail user's old and new e-mail account address be registered at the e-mail clearing house server 108. As another example, FIG. 3 illustrates that a user 302 using personal computer 304 may directly connect to e-mail clearing house server 108 via network 106 and request that the e-mail user's old and new e-mail account address be registered at the e-mail clearing house server 108.

Figure 4:
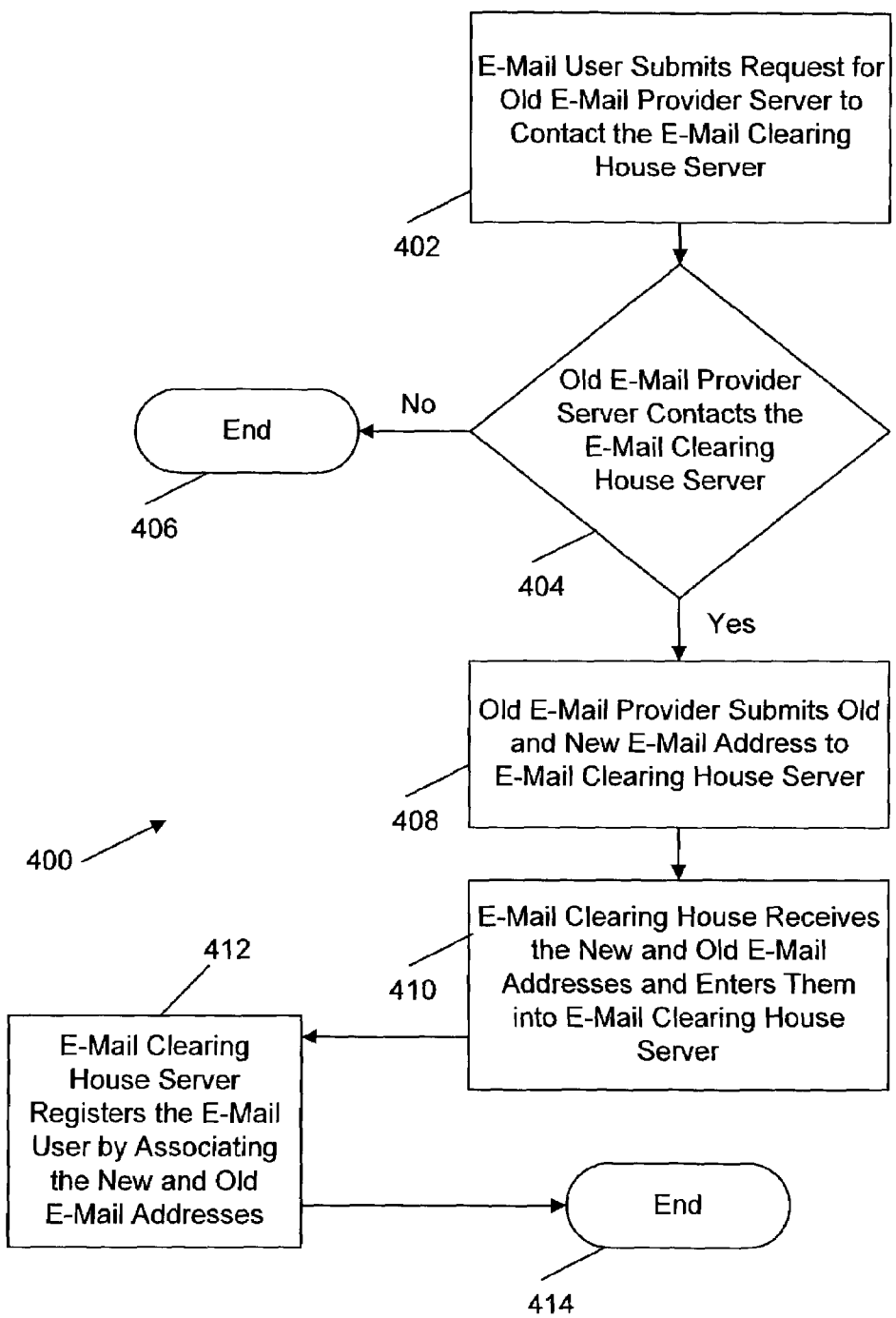
FIG. 4 is a flow chart of an exemplary registration method of an embodiment of the present invention.

In accordance with one embodiment of the present invention, FIG. 4 illustrates a flow chart of a method 400 for registering the e-mail user. Method 400 begins when the e-mail user submits a request for the old e-mail provider server 102 to contact e-mail clearing house server 108 (Step 402). If old e-mail provider server 102 does not contact the e-mail clearing house server 108 (Step 404), method 400 ends (Step 406). If the old-e-mail provider server 102 contacts e-mail clearing house server 108, old e-mail provider server 102 submits the old and new e-mail address to e-mail clearing house server 108 (Step 408).

In response to the submission of the old and new e-mail account addresses, e-mail clearing house server 108 receives the new and old e-mail addresses and enters them into e-mail clearing house server 108 (Step 410). Then, E-mail clearing house server 108 registers the e-mail user by associating the new and old e-mail addresses (Step 412) and method 400 ends (Step 414).

Figure 5:
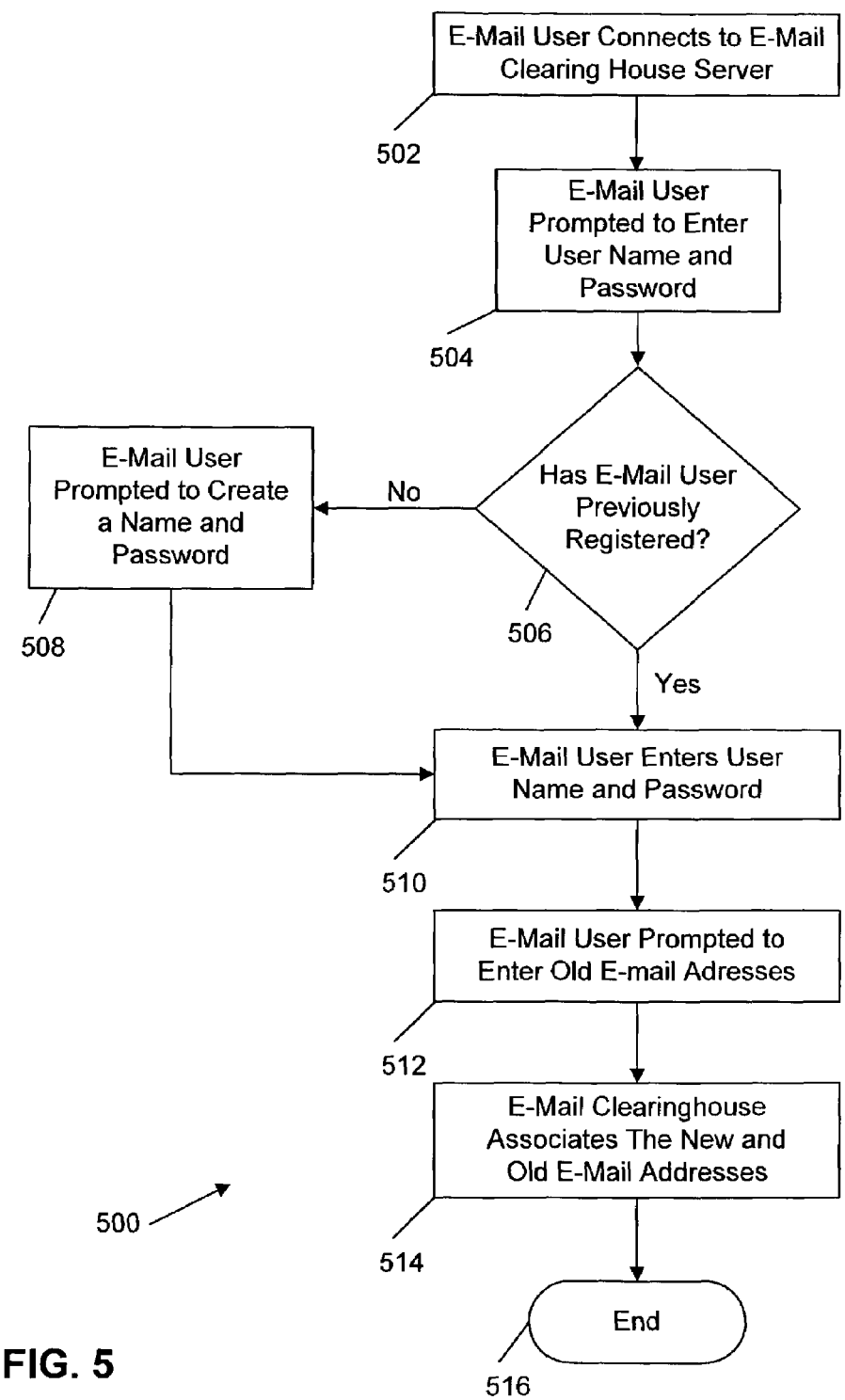
FIG. 5 is a flow chart of another exemplary registration method of an embodiment of the present invention.

In accordance with another embodiment of the present invention, FIG. 5 illustrates a flow chart of another method 500 for registering the e-mail user. Method 500 begins with the e-mail user connecting to e-mail clearing house server 108 (Step 502). Once the e-mail user is connected to e-mail clearing house server 108, the e-mail user is prompted to enter a user name and password (Step 504). If the e-mail user has not been previously registered (Step 506), the e-mail user is prompted to create a user name and password (Step 508).

If the e-mail user has been previously registered (Step 506) or the e-mail user has created a user name and password, the e-mail user enters the user name and password (Step 510). Then, the e-mail user is prompted to enter the new and old e-mail addresses (Step 512). Once the e-mail addresses are entered, e-mail clearing house server 108 associates the old and new e-mail addresses (Step 514) and method 500 ends (Step 516).

In one embodiment of the present invention, during the registration process, the e-mail user has the option to specify how the e-mails to the old e-mail account will be delivered. As one option, the e-mail user may select that a message is first sent to the new e-mail account notifying the e-mail user that an e-mail address to the old e-mail account has been received, and give the e-mail user the option to reject or accept the e-mail. The e-mail user may also indicate that the new e-mail account address may be provided to the e-mail sender.

For example, the e-mail user may be sent a notification e-mail to the new e-mail account address notifying the e-mail user of the e-mail sent to the old e-mail account and requesting that the e-mail user respond to the e-mail indicating whether the e-mail should be rejected or forwarded to the new e-mail account address. The notification e-mail may also inquire whether the new e-mail account address should be provided to the e-mail sender.

While e-mail clearing house server 108 awaits the e-mail user's response, the e-mail sent to the old e-mail account may be stored in a queue (not shown) in e-mail clearing house server 108. Then, when the e-mail user responds, for example using a reply e-mail, e-mail clearing house server 108 takes the appropriate action. If the e-mail user's response indicates that the e-mail should be forwarded to the new e-mail account address, the e-mail is sent from the queue to the new e-mail account address and an e-mail may be sent to the e-mail sender indicating the e-mail user's new e-mail account address. However, if the e-mail user's response indicates that the e-mail should be rejected, then e-mail clearing house server 108 may send an e-mail to the e-mail sender indicating that the e-mail could not be delivered or that the e-mail user did not wish to receive the e-mail.

As a second option, the e-mail user may select that e-mails addressed to the old e-mail account be directly delivered to the new e-mail account address and allow the e-mail user to use the e-mail in a standard manner (e.g., delete, save, reply, and forward the e-mail). For example, e-mail clearing house server 108 may receive the e-mail addressed to the old e-mail account address in a queue (not shown) and then, after determining the new e-mail account address, the e-mail is forwarded to the e-mail user.

In accordance with an embodiment of the present invention, in order for old e-mail provider server 102 to forward e-mails to clearing house server 108 in exemplary e-mail forwarding system 100, an arrangement may be reached between the old e-mail provider server 102 and e-mail clearing house server 108. In the arrangement, a fee paid by the e-mail user may be shared between the old e-mail provider server 102 and e-mail clearing house server 108. The fee or revenue sharing scheme will be discussed below in further detail.

Once the user's old and new e-mail account addresses are registered with e-mail clearing house server 108 and an e-mail addressed to the old e-mail account is received at e-mail clearing house server 108, the e-mail is associated with the new e-mail account address. This may be accomplished by performing a lookup between the old and new e-mail account addresses. The e-mail can then be forwarded to the new e-mail account address. As illustrated in FIG. 3, the look-up may be accomplished using a lookup table having a one-to-one mapping 306 or a many-to-one mapping 308. A many-to-one map associates one or more e-mail account addresses to a new e-mail account address. For example, a user may receive e-mail sent to a previous YAHOO, HOTMAIL, or work e-mail account and the look-up table associates the e-mail addresses of the received e-mails to the new e-mail account address, before the received e-mails are forwarded to the e-mail user using a standard e-mail protocol.

In an example, old e-mail provider server 102 receives an e-mail with the old e-mail account address (e.g., Lanny@oldcompany.com) and forwards the e-mail to an e-mail address at e-mail clearing house server 108 (e.g., Lanny@e-mailclearinghouse.com). In e-mail clearing house server 108, the new e-mail address is retrieved using the look-up table and the e-mail is sent to the e-mail user at the new address e-mail account address (e.g., Lanny@newcompany.com).

In one embodiment of the present invention, the e-mail forwarding functions of e-mail clearing house server 108 may be implemented using a Java mail Application Program Interface ("API"). The Java mail API uses the Internet Messaging Access Protocol ("IMAP") to retrieve the sent e-mail from a stack (not shown) within e-mail clearing house server 108 and identifies the address to whom the e-mail is being sent. In the exemplary embodiment, this is accomplished by reading the "To" field of the message using the Java mail API.

Then, the API uses look-up tables, such as tables 306 and 308. Examples of such lookup tables include but are not limited to an index file, a text file, a database, an EXCEL spreadsheet, or a Lightweight Directory Access Protocol ("LDAP") compliant directory. LDAP is a conventional protocol used to access a directory listing. LDAP support is being implemented in Web browsers and e-mail programs, which can query an LDAP-compliant directory. The lookup table associates the old e-mail account address to a new e-mail account address. Then, the Java mail API takes the new "TO" field and replaces it in the message packet before the e-mail is forwarded via the Java mail API to the new e-mail account address. It is important to note that receiving, associating the old and new e-mail account addresses, and forwarding the e-mail message with e-mail clearing house server 108 may be implemented using PERL system mail commands, UNIX scripts, or other computer instructions.

Figure 6:
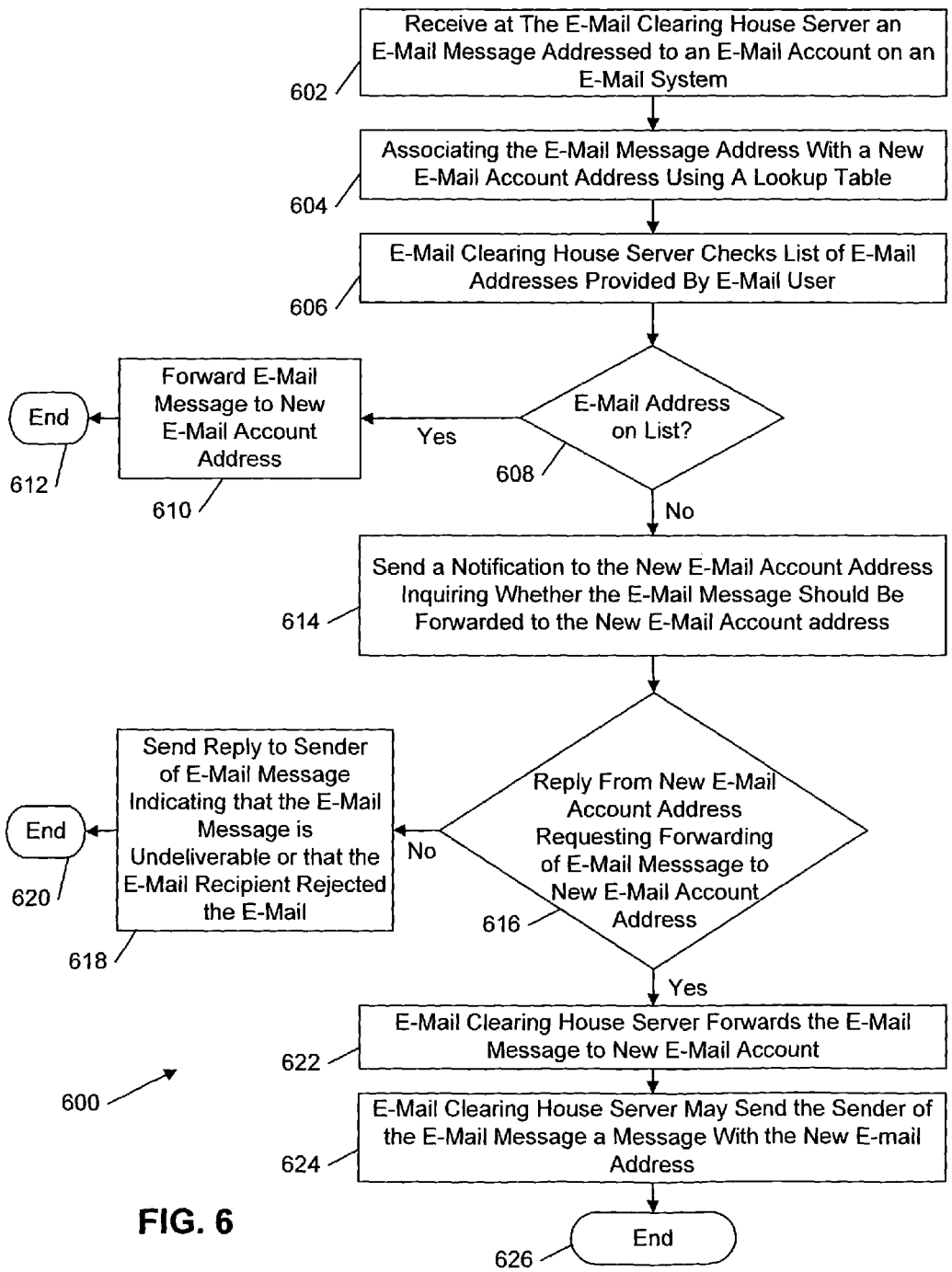
FIG. 6 is a flow chart of an exemplary e-mail forwarding method of an embodiment of the present invention.

In accordance with an embodiment of the present invention, FIG. 6 illustrates a flow chart of a method 600 for forwarding an e-mail addressed to an e-mail account on a first e-mail system to a new e-mail account address on another e-mail system. Method 600 begins by receiving an e-mail message addressed to an e-mail account on a first e-mail system at the e-mail clearing house server 108 (Step 602). Then, the e-mail message address is associated with the new e-mail account address using, for example, a lookup table (Step 604).

Once the old e-mail message address and the new e-mail account address are associated, e-mail clearing house server 108 checks a list of e-mail addresses provided by the e-mail user (Step 606). If the e-mail address of the e-mail message is found in the list (Step 608), the e-mail message is forwarded to the new e-mail account address (Step 610) and method 600 ends (Step 612). If the e-mail address of the e-mail address is not found on the list (Step 608), a notification is sent to the new e-mail account address inquiring whether the e-mail message should be forwarded to the new e-mail account address (Step 614).

If a reply is not received from the new e-mail account address requesting that the e-mail message is forwarded to the new e-mail account address (Step 616), a reply is sent to the sender of the e-mail message indicating the e-mail message is undeliverable or that the e-mail recipient rejected the e-mail message (Step 618) and method 600 ends (Step 620).

If, however, a reply is received from the new e-mail account address requesting that the e-mail message is forwarded to the new e-mail account address, e-mail clearing house server 108 forwards the e-mail message to the new e-mail account address (Step 622). Then, e-mail clearing house server 108 may send a message to the sender of the e-mail message with the e-mail user's new e-mail account address (Step 624) and method 600 ends (Step 626).

In accordance with an embodiment of the present invention to provide an incentive for old e-mail provider server 102 to forward incoming e-mails to e-mail clearing house server 108 for a predefined or selectable period of time (e.g., 30 or 45 days), a revenue model is provided. This revenue model may provide a source of income for old e-mail provider server 102 in exchange for the bandwidth used to receive and forward the e-mails to e-mail clearing house server 108. In the revenue model, unless old e-mail provider server 102 is willing to forward the received e-mails for free, an arrangement is reached between old e-mail provider server 102 and e-mail clearing house server 108. One arrangement may be that the e-mail user pays old e-mail provider server 102 a fee for forwarding received e-mails for a predetermined or selectable period of time, and that amount may be divided between old e-mail provider server 102 and e-mail clearing house server 108 (e.g., old e-mail provider sever 102 receives 40% of the revenue and e-mail clearing house server 108 receives 60% of the revenue).

Another arrangement may be that the e-mail user during the registration process with e-mail clearing house server 108 provides the information for old e-mail provider server 102, and agrees to pay a fee for the forwarding of the received e-mails. When the e-mail user changes e-mail account addresses, the e-mail user notifies e-mail clearing house server 108. In turn, e-mail clearing house server 108 contacts old e-mail provider server 102 and arranges for the received e-mails to be forwarded to e-mail clearing house server 108 for delivery to the new e-mail account. As an incentive, e-mail clearing house server 108 may offer old e-mail provider server 102 some percentage of the fee paid by the e-mail user. In both of the above arrangements, the amount paid by the user may vary based upon the period of time the user desires for the received e-mails to be forwarded to e-mail clearing house server 108.

Figure 7:
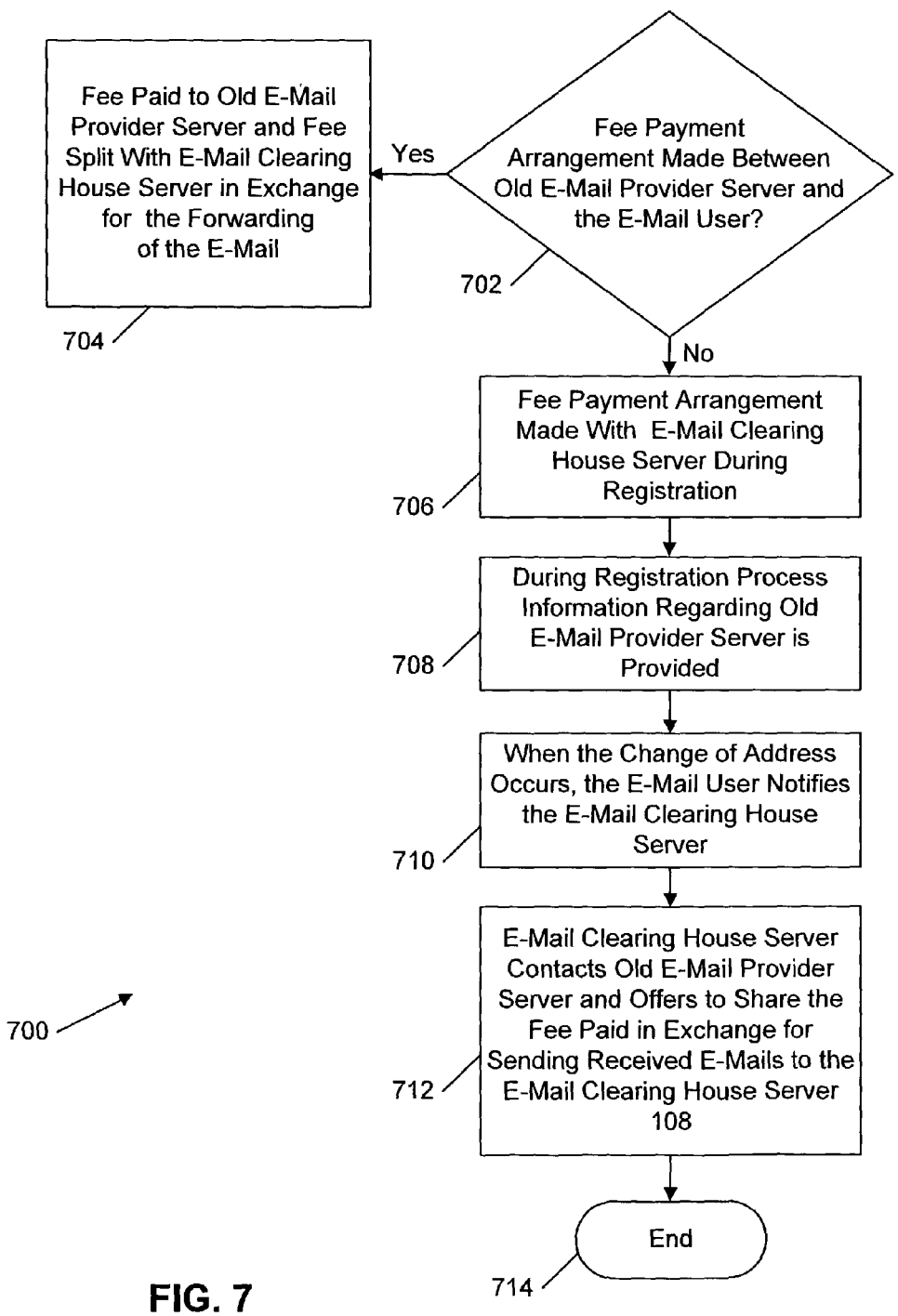
FIG. 7 is a flow chart of an exemplary incentive and revenue splitting method of an embodiment of the present invention.

In accordance with one embodiment of the present invention, FIG. 7 illustrates a method 700 for providing an incentive and revenue sharing arrangement between old e-mail provider server 102 and e-mail clearing house server 108. Method 700 begins with decision Step 702, where a determinations is made as to whether a fee payment arrangement has been reached between old-e-mail provider server 102 and the e-mail user.

If a fee payment arrangement has been reached between old e-mail provider server 102 and the e-mail user, the fee paid to old e-mail provider server 102 is shared with e-mail clearing house server 108 (Step 704). If a fee payment arrangement has not been reached between old e-mail provider server 102 and the e-mail user (Step 702), a fee payment arrangement is made between e-mail clearing house server 108 and the e-mail user, during the registration process at e-mail clearing house server 108 (Step 706). During the registration process, information regarding old-e-mail provider server 102 is provided to e-mail clearing house server 108 (Step 708).

Then, when a change in e-mail address occurs, the e-mail user notifies e-mail clearing house server 108 (Step 710) and e-mail clearing house server 108 contacts old e-mail provide server 102 and offers to share the fee paid by the e-mail user. In exchange for the shared fee, old e-mail provider server 102 sends received e-mails to e-mail clearing house server 108 (Step 712) and method 700 ends (Step 714).

In another embodiment, the present invention may also be implemented in an intra-company environment. In large companies with many divisions and subsidiaries, employees tend to be transferred between divisions every two to three years with accompanying changes in e-mail account addresses. In this situation where the e-mail user has changed e-mail accounts numerous times, it is more convenient and efficient to forward, for a predetermined period of time, the e-mails from the changed e-mail accounts to an e-mail forwarding server, such as e-mail clearing house server 108. E-mail clearing house server 108 will in turn forward the e-mails from the various accounts to the new e-mail account address.

In view of the foregoing, it will be appreciated that the present invention provides systems and methods for forwarding e-mails. Still, it should be understood that the foregoing relates only to the exemplary embodiments of the present invention, and that numerous changes may be made thereto without departing from the spirit and scope of the invention as defined by the following claims.

What is claimed is:

1. An e-mail clearing house server, comprising:
   a memory with a look-up table;
   a network connection to a first and a second e-mail system; and
   a processor operative to:
   receive a first message from the network connection to the first e-mail system, the first message being previously addressed to a first e-mail account address on the first e-mail system;
   associate the first message with a second e-mail account address on the second e-mail system;
   forward the first message to the second e-mail system with the second e-mail account address;
   arrange a fee payment between the first e-mail system and the e-mail clearing house server;
   send a notification message to the second e-mail account address about the first message;
   receive a response from the second e-mail account address; and
   forward the first message to the second e-mail account address if indicated by the response.

2. The e-mail clearing house server of claim 1, wherein the processor uses the look-up table stored in the memory to generate the association between the first message and the second e-mail account address.

3. The e-mail clearing house server of claim 2, wherein the processor uses the look-up table to associate the first e-mail account address and a third e-mail account address with the second e-mail account address.

4. The e-mail clearing house server of claim 1, wherein the processor is operative to provide a portion of the fee payment to the first e-mail system as an incentive to forward the first message to the e-mail clearing house server.

5. The e-mail clearing house of claim 4, wherein the portion of the fee payment varies based upon a time period that a user desires for the first message to be forwarded to the second e-mail account address.

6. The e-mail clearing house server of claim 1, wherein the processor is operative to receive the fee payment and share the fee payment with the first e-mail system.

7. The e-mail clearing house server of claim 6, wherein the processor arranges for the fee payment and receives contact information to arrange to share the fee payment with the first e-mail system during a registration process.

8. An e-mail clearing house server, comprising:
   a memory with a look-up table;
   a network connection to a first and a second e-mail system; and
   a processor operative to:

receive a first message from the network connection to the first e-mail system, the first message being previously addressed to a first e-mail account address on the first e-mail system;

associate the first message with a second e-mail account address on the second e-mail system;

forward the first message to the second e-mail system with the second e-mail account address;

arrange a fee payment between the first e-mail system and the e-mail clearing house server;

send a notification message to the second e-mail account address about the first message;

receive a response from the second e-mail account address; and send the second e-mail account address to a sender of the first message if indicated by the response.

9. The e-mail clearing house server of claim 8, wherein the processor uses the look-up table stored in the memory to generate the association between the first message and the second e-mail account address.

10. The e-mail clearing house server of claim 9, wherein the processor uses the look-up table to associate the first e-mail account address and a third e-mail account address with the second e-mail account address.

11. The e-mail clearing house server of claim 8, wherein the processor is operative to provide a portion of the fee payment to the first e-mail system as an incentive to forward the first message to the e-mail clearing house server.

12. The e-mail clearing house server of claim 11, wherein the processor arranges for the fee payment and receives contact information to arrange to share the fee payment with the first e-mail system during a registration process.

13. The e-mail clearing house of claim 11, wherein the portion of the fee payment varies based upon a time period that a user desires for the first message to be forwarded to the second e-mail account address.

14. An e-mail clearinghouse server, comprising:
a memory with a look-up table;
a network connection to a first and a second e-mail system; and
a processor operative to:
receive a first message from the network connection to the first e-mail system, the first message being previously addressed to a first e-mail account address on the first e-mail system;
associate the first message with a second e-mail account address on the second e-mail system;
forward the first message to the second e-mail system with the second e-mail account address;
arrange a fee payment between the first e-mail system and the e-mail clearing house server;
send a notification message to the second e-mail account address about the first message;
receive a response from the second e-mail account address; and
block the first message from being sent to the second e-mail account address if indicated by the response.

15. The e-mail clearing house server of claim 14, wherein the processor uses the look-up table stored in the memory to generate the association between the first message and the second e-mail account address.

16. The e-mail clearing house server of claim 15, wherein the processor uses the look-up table to associate the first e-mail account address and a third e-mail account address with the second e-mail account address.

17. The e-mail clearing house server of claim 14, wherein the processor is operative to provide a portion of the fee payment to the first e-mail system as an incentive to forward the first message to the e-mail clearing house server.

18. The e-mail clearing house server of claim 17, wherein the processor arranges for the fee payment and receives contact information to arrange to share the fee payment with the first e-mail system during a registration process.

19. The e-mail clearing house of claim 17, wherein the portion of the fee payment varies based upon a time period that a user desires for the first message to be forwarded to the second e-mail account address.

20. A method for forwarding electronic mail, comprising:
receiving a first message from a first e-mail system, the first message being previously addressed to a first e-mail account address on the first e-mail system;
associating the first message with a second e-mail account address;
forwarding the first message to the second e-mail account address; and
arranging an incentive to be shared between the first e-mail system and a forwarding system that receives the first message;
sending a notification message to the second e-mail account address about the first message;
receiving a response from the second e-mail account address; and
forwarding the first message to the second e-mail account address if indicated by the response.

21. The electronic mail forwarding method of claim 20, wherein the associating step further comprises using a look-up table to generate the association between the first message and the second e-mail account address.

22. The electronic mail forwarding method of claim 21, wherein the look-up table associates the first e-mail account address and a third e-mail account address with the second e-mail account address.

23. The electronic mail forwarding method of claim 20, wherein arranging the incentive includes paying a fee to the first e-mail system and the fee is shared between the first e-mail system and the forwarding system.

24. The electronic mail forwarding method of claim 20, wherein arranging the incentive includes paying a fee to the forwarding system and the fee is shared between the forwarding system and the first e-mail system.

25. The electronic mail forwarding method of claim 24, wherein a user arranges to pay the fee to the forwarding system and provides contact information to arrange to share the fee with the first e-mail system during a registration process.

26. The electronic mail forwarding method of claim 20, wherein arranging the incentive includes varying the incentive based upon a time period that a user desires for the first message to be forwarded to the second e-mail account address.

27. A method for forwarding electronic mail, comprising:
receiving a first message from a first e-mail system, the first message being previously addressed to a first e-mail account address on the first e-mail system;
associating the first message with a second e-mail account address;
forwarding the first message to the second e-mail account address;
arranging an incentive to be shared between the first e-mail system and a forwarding system that receives the first message;
sending a notification message to the second e-mail account address about the first message;

receiving a response from the second e-mail account address; and sending the second e-mail account address to a sender of the first message if indicated by the response.

28. The electronic mail forwarding method of claim 27, wherein the associating step further comprises using a look-up table to generate the association between the first message and the second e-mail account address.

29. The electronic mail forwarding method of claim 28, wherein the look-up table associates the first e-mail account address and a third e-mail account address with the second e-mail account address.

30. The electronic mail forwarding method of claim 27, wherein arranging the incentive includes paying a fee to the first e-mail system and the fee is shared between the first e-mail system and the forwarding system.

31. The electronic mail forwarding method of claim 30, wherein a user arranges to pay the fee to the forwarding system and provides contact information to arrange to share the fee with the first e-mail system during a registration process.

32. The electronic mail forwarding method of claim 27, wherein arranging the incentive includes varying the incentive based upon a time period that a user desires for the first message to be forwarded to the second e-mail account address.

33. A method for forwarding electronic mail, comprising:
receiving a first message from a first e-mail system, the first message being previously addressed to a first e-mail account address on the first e-mail system;
associating the first message with a second e-mail account address;
forwarding the first message to the second e-mail account address;
arranging an incentive to be shared between the first e-mail system and a forwarding system that receives the first message;
sending a notification message to the second e-mail account address about the first message;
receiving a response from the second e-mail account address; and
blocking the first message from being sent to the second e-mail account address if indicated by the response.

34. The electronic mail forwarding method of claim 33, wherein the associating step further comprises using a look-up table to generate the association between the first message and the second e-mail account address.

35. The electronic mail forwarding method of claim 34, wherein the look-up table associates the first e-mail account address and a third e-mail account address with the second e-mail account address.

36. The electronic mail forwarding method of claim 33, wherein arranging the incentive includes paying a fee to the first e-mail system and the fee is shared between the first e-mail system and the forwarding system.

37. The electronic mail forwarding method of claim 36, wherein a user arranges to pay the fee to the forwarding system and provides contact information to arrange to share the fee with the first e-mail system during a registration process.

38. The electronic mail forwarding method of claim 33, wherein arranging the incentive includes varying the incentive based upon a time period that a user desires for the first message to be forwarded to the second e-mail account address.

39. A computer-readable medium on which is stored a set of instructions for forwarding electronic mail, which when executed perform steps comprising:
receiving an e-mail originally sent to a first e-mail account address on a first e-mail system;
associating the e-mail with a second e-mail account address on a second e-mail system;
forwarding the e-mail to the second e-mail account address;
arranging a fee payment between the first e-mail system and a forwarding system that receives the e-mail;
sending a notification message to the second e-mail account address requesting permission to forward the e-mail;
receiving a response from the second e-mail account address; and
forwarding the e-mail to the second e-mail account address if permission is granted to forward the e-mail in the response.

40. The computer-readable medium of claim 39, wherein the associating step further comprises using a look-up table to generate the association between the first account address and the second e-mail account address.

41. The computer-readable medium of claim 39, wherein the look-up table associates the first e-mail account address and a third e-mail account address with the second e-mail account address.

42. The computer-readable medium of claim 39, further comprising arranging a portion of the fee payment to be shared with the first e-mail system as an incentive to forward the e-mail to the forwarding system.

43. The computer-readable medium of claim 42, wherein arranging the portion of the fee payment to be shared with the first e-mail system includes determining an amount for the portion, based on a period of time that the e-mail is to be forwarded to the second e-mail account address.

44. The computer-readable medium of claim 42, wherein arranging the fee payment includes making the fee payment to the forwarding system and the fee payment is shared with the first e-mail system.

45. The computer-readable medium of claim 44, wherein a user arranges the fee payment with the forwarding system and provides contact information to share the fee payment with the first e-mail system during a registration process.

46. A computer-readable medium on which is stored a set of instructions for forwarding electronic mail, which when executed perform steps comprising:
receiving an e-mail originally sent to a first e-mail account address on a first e-mail system;
associating the e-mail with a second e-mail account address on a second e-mail system;
forwarding the e-mail to the second e-mail account address;
arranging a fee payment between the first e-mail system and a forwarding system that receives the e-mail;
sending a notification message to the second e-mail account address requesting permission to forward the e-mail;
receiving a response from the second e-mail account address; and
sending the second e-mail account address to a sender of the e-mail if indicated in the response.

47. The computer-readable medium of claim 46, wherein the associating step further comprises using a look-up table to generate the association between the first account address and the second e-mail account address.

48. The computer-readable medium of claim 46, wherein the look-up table associates the first e-mail account address and a third e-mail account address with the second e-mail account address.

49. The computer-readable medium of claim 46, further comprising arranging a portion of the fee payment to be shared with the first e-mail system as an incentive to forward the e-mail to the forwarding system.

50. The computer-readable medium of claim 49, wherein arranging the portion of the fee payment to be shared with the first e-mail system includes determining an amount for the portion, based on a period of time that the e-mail is to be forwarded to the second e-mail account address.

51. The computer-readable medium of claim 50, wherein a user arranges the fee payment with the forwarding system and provides contact information to share the fee payment with the first e-mail system during a registration process.

52. A computer-readable medium on which is stored a set of instructions for forwarding electronic mail, which when executed perform steps comprising:
  receiving an e-mail originally sent to a first e-mail account address on a first e-mail system;
  associating the e-mail with a second e-mail account address on a second e-mail system;
  forwarding the e-mail to the second e-mail account address;
  arranging a fee payment between the first e-mail system and a forwarding system that receives the e-mail;
  sending a notification message to the second e-mail account address requesting permission to forward the e-mail;
  receiving a response from the second e-mail account address; and
  blocking the e-mail from being sent to the second e-mail account address if permission to forward the e-mail is denied in the response.

53. The computer-readable medium of claim 52, wherein the associating step further comprises using a look-up table to generate the association between the first account address and the second e-mail account address.

54. The computer-readable medium of claim 52, wherein the look-up table associates the first e-mail account address and a third e-mail account address with the second e-mail account address.

55. The computer-readable medium of claim 52, further comprising arranging a portion of the fee payment to be shared with the first e-mail system as an incentive to forward the e-mail to the forwarding system.

56. The computer-readable medium of claim 55, wherein arranging the portion of the fee payment to be shared with the first e-mail system includes determining an amount for the portion, based on a period of time that the e-mail is to be forwarded to the second e-mail account address.

57. The computer-readable medium of claim 56, wherein a user arranges the fee payment with the forwarding system and provides contact information to share the fee payment with the first e-mail system during a registration process.

* * * * *